United States Patent [19]
Giovannoli

[11] Patent Number: 5,758,328
[45] Date of Patent: May 26, 1998

[54] COMPUTERIZED QUOTATION SYSTEM AND METHOD

[76] Inventor: Joseph Giovannoli, 30 Bayberry Dr., Saddle River, N.J. 07458

[21] Appl. No.: 603,906

[22] Filed: Feb. 22, 1996

[51] Int. Cl.⁶ .................................................. G06F 7/06
[52] U.S. Cl. .................................................. 705/26; 705/27
[58] Field of Search .................................. 395/201, 226, 395/227, 237; 705/26, 27

[56] References Cited

U.S. PATENT DOCUMENTS

| | | | |
|---|---|---|---|
| 4,734,858 | 3/1988 | Schlafly | 364/408 |
| 4,799,156 | 1/1989 | Shavit et al. | 364/401 |
| 4,922,940 | 5/1990 | Dworkin | 395/226 |
| 4,972,318 | 11/1990 | Brown et al. | 364/403 |
| 4,992,940 | 2/1991 | Dworkin | 364/401 |
| 5,077,665 | 12/1991 | Silverman . | |
| 5,136,501 | 8/1992 | Silverman et al. . | |
| 5,168,446 | 12/1992 | Wiseman | 364/408 |
| 5,237,499 | 8/1993 | Garback . | |
| 5,305,200 | 4/1994 | Hartheimer et al. . | |
| 5,309,355 | 5/1994 | Lockwood . | |
| 5,351,186 | 9/1994 | Bullock et al. . | |
| 5,361,199 | 11/1994 | Shoquist et al. . | |
| 5,375,055 | 12/1994 | Togher | 364/408 |
| 5,402,336 | 3/1995 | Spiegelhoff et al. . | |
| 5,485,370 | 1/1996 | Moss et al. . | |
| 5,500,793 | 3/1996 | Demlog, Jr. et al. . | |

OTHER PUBLICATIONS

Author unknown, IBNL Forges Into the Future of Buying and Selling with Source Interactive Software, PR Newswire, Jan. 10, 1996.

Author unknown, IBNL Announces Signing of More Than $8 Billion in Buying Power, Business Wire, Nov. 15, 1996.

*Primary Examiner*—Edward R. Cosimano
*Assistant Examiner*—Phillp Groutt
*Attorney, Agent, or Firm*—Jeffrey Kaplan

[57] ABSTRACT

A computerized system for forming a computer based communications network of network members inclusive of network buyers and or network vendors for processing requests for quotation for goods and services through at least one central processing unit including operating system software for controlling the central processing unit, storage means containing the identification of network members, means for network buyers to generate request for quotation for goods and/or services, means for transmitting said request for quotation to said central processing unit, filter means for selecting appropriate network members to receive said request for quotation based on filter conditions defined by the buyer in said request for quotation and/or by the vendor and/or by the central processing unit, means for broadcasting said request for quotation to the network members selected by said filter means and means for responding to the generator of said request for quotation with either a response to said request for quotation or with a list of said selected network members. Filter conditions may define the class of vendors in terms of geographical location, quantity, language spoken, currency, special conditions of sale, and the like.

19 Claims, 9 Drawing Sheets

THE PRICE QUOTATION SYSTEM PROVIDES AN INTERNET HOME PAGE FOR USERS WHO HAVE:

1. SOFTWARE TO ACCESS THE INTERNET (WORLD WIDE WEB)
2. ACCESS TO THE INTERNET VIA A LOCAL ACCESS PROVIDER

THE USER CONNECTS TO THE INTERNET AND ACCESSES THE QUOTATION SYSTEM INTERNET ADDRESS. ONCE ACCESSED, THE SYSTEM PROVIDES A LIST OF OPTIONS, ONE OF WHICH IS "DO YOU WANT TO REQUEST A PRICE QUOTATION?. THE BUYER SELECTS THIS OPTION.

---

THE BUYER NEXT SELECTS A PRODUCT TYPE, e.g. :
COMPUTER PRODUCTS
APPLIANCES
ELECTRONIC PARTS AND COMPONENTS
ET CETERA

---

THE BUYER REQUESTS A QUOTATION FOR EITHER:
  A CATEGORY OF ITEMS (e.g. PERSONAL COMPUTER MONITORS); OR
  A SPECIFIC ITEM (e.g. SEGATE MODEL 225 HARD DISK DRIVE)

ONCE SELECTED, THE BUYER SUBMITS THE REQUEST BY SELECTING AN OPTION ON THE INTERNET SITE REQUEST FORM.

---

THE QUOTATION SYSTEM PROCESSES THE REQUEST BY SELECTING A CLASS OF VENDORS WHO SELL THE REQUESTED PRODUCT(S) AND MEET THE FILTER REQUIREMENTS OF THE BUYER, VENDOR, AND THE QUOTATION SYSTEM. THE QUOTATION SYSTEM THEN MAKES AVAILABLE THE REQUEST(S) TO EACH SELECTED VENDOR VIA FILE TRANSFER PROTOCOL (FTP) OR E-MAIL.

---

EACH SELECTED VENDOR RESPONDS TO THE REQUEST(S) BY PROVIDING ITS PRICING AND OTHER INFORMATION TO THE QUOTATION SYSTEM. THIS IS DONE AUTOMATICALLY USING SOFTWARE PROVIDED BY THE QUOTATION SYSTEM TO EACH VENDOR. VENDOR SOFTWARE CONNECTS WITH THE QUOTATION SYSTEM ON A VENDOR DETERMINED SCHEDULE FOR THE PURPOSE OF RECEIVING REQUESTS FOR QUOTATION AND RESPONDING THERETO WITH INVENTORY AND PRICING INFORMATION EACH VENDOR KEEPS CURRENT USING THE QUOTATION SYSTEM PROVIDED SOFTWARE.

*FIG. 2A*

THE QUOTATION SYSTEM USES THE VENDOR'S QUOTATIONS TO PREPARE E-MAIL FOR THE REQUESTING BUYER. THE E-MAIL CAN BE FORMATTED USING HTML CODES TO PERMIT THE BUYER TO DISPLAY ITS E-MAIL AS IF IT WERE AN HTML PAGE. IN THIS WAY THE E-MAIL RESPONSE WILL HAVE HTML HYPERTEXT CAPABILITY AND ENABLE THE BUYER TO SELECT OPTIONS FROM THE HTML CODED E-MAIL FOR CONVENIENT PROCESSING OF THE QUOTATIONS. SUCH OPTIONS MAY INCLUDE SENDING AN ELECTRONIC PURCHASE ORDER IN RESPONSE TO A VENDORS QUOTATION AND REQUESTING THAT APPROPRIATE CREDIT INFORMATION OF THE BUYER BE PROVIDED TO THE VENDOR FROM RECORDS KEPT BY THE QUOTATION SYSTEM. APPLICATION HELPER SOFTWARE CAN BE PROVIDED BY THE QUOTATION SYSTEM TO SYSTEM MEMBERS FOR CONVENIENT PROCESSING OF HTML E-MAIL RESPONSES.

*FIG. 2B*

A VENDOR MAY POST SPECIAL SALE ITEMS TO THE QUOTATION SYSTEM VIA THE INTERNET OR OTHERWISE. IN TURN THE SYSTEM WILL FORWARD THE SPECIAL SALE OFFERS TO ANY USER WHO REGISTERS OR HAS REGISTERED THEIR INTEREST IN RECEIVING SALE OFFERS FOR THE PRODUCT OR CATEGORY BEING OFFERED BY THE VENDOR, PROVIDED THE USER MEETS THE VENDOR'S AND THE QUOTATION SYSTEM'S FILTER REQUIREMENTS.

FOR EXAMPLE, COMPUTER CITY COMMUNICATES TO THE QUOTATION SYSTEM A SPECIAL SALE ON IBM TYPE PERSONAL COMPUTER MONITORS.

IF A SYSTEM MEMBER PRE-REGISTERED ITS INTEREST IN RECEIVING OFFERS FOR PERSONAL COMPUTER MONITORS (e.g. VIA THE QUOTATION SYSTEM'S INTERNET SITE), THE SYSTEM WILL E-MAIL THE COMPUTER CITY SALE INFORMATION TO THE SYSTEM MEMBER'S E-MAIL ADDRESS PROVIDED THE MEMBER IS LOCATED IN A VENDOR SPECIFIED AREA.

*FIG. 3*

SAMPLE BUYER'S DATA PACKET
- BUYER'S IDENTIFICATION (CODE)
- TRACKING NUMBER
- DATE AND TIME
- PRODUCT IDENTIFICATION
- QUANTITY
- SHIP METHOD
- SHIP DESTINATION
- VENDOR QUALIFICATIONS (FILTER CONDITIONS)
- BUYER'S NOTES

NOTE: BUYER'S FILTER CONDITIONS MIGHT INCLUDE LANGUAGE SPOKEN, CURRENCY OF QUOTATION, TYPE OF VENDOR (e.g. MANUFACTURER, DISTRIBUTOR, RETAILER, ECT.), OR LOCATION OF THE VENDOR.

VENDOR ADDS TO THE DATA PACKET
- VENDORS IDENTIFICATION (CODE)
- QUOTATION NUMBER
- QUOTATION DATE
- QUOTATION EXPIRATION
- PRICE PER UNIT
- TOTAL PRICE
- TAXES
- SHIPPING CHARGE
- DELIVERY TIME
- VENDOR'S NOTES

NOTE: VENDOR'S FILTER QUALIFICATIONS FOR BUYERS CAN BE REGISTERED WITH THE QUOTATION SYSTEM CENTRAL OFFICE IN ADVANCE ENABLING THE CENTRAL OFFICE TO FILTER BUYER'S RFQS AND PROVIDE VENDORS WITH FILTER QUALIFIED BUYERS.

*FIG. 7*

PRICE QUOTATION

RFQ DATE: 07/02/1993
PROD. TYPE NO. : 12432
PROD. CATEGORY : RESISTORS
PRODUCT NAME : TYPE J RESISTOR 5%
PRODUCT NUMBER : OHO06-2000656
MANUFACTURER : OHMITE
QUANTITY : 5,000   PIECES
NOTES : DELIVERY DATE IS FIRM.

TRACKING NO : 1016
ROUTING TO : NEW JERSEY
PROD. CODE : 4800

DELIVERY DATE : 08/01/1993

QUOTE DATE : 07/03/1993  VENDOR NO. : 456546
VENDOR NAME : ACME RESISTIOR SUPPLY, INC.
CONTACT    : JOHN MURRAY
VENDOR PHONE : 515 222-3333
VENDOR FAX   : 515 222-3056
CAN SHIP BY : 07/03/1993

```
                              UNIT PRICE :       0.28
                  5,000 PIECE            =   1,400.00
                              SALES TAX  :       0.00
                              UPS GROUND :      26.00
                                         = ========
                                             1,426.00
```

VENDOR NOTES : SHIPPED 1000 PER BOX FROM INVENTORY, SUBJECT TO PRIOR SALE.

ACCEPT/REJECT QUOTE :

*FIG. 8*

COMPUTERIZED QUOTATION SYSTEM AND METHOD

FIELD OF THE INVENTION

This invention relates generally to a computerized system forming a computer based communications network of buyer and vendor members for processing requests for quotation for goods and/or services from network members or their representatives and for linking buyers to sellers through the computer based communications network of network members having means for selectively controlling the linkage between network members in accordance with filter conditions of the buyers and/or sellers as well as filter conditions established by the computerized system. The filter conditions determine which of the network sellers will receive a buyer's request for quotation. More particularly this invention relates to a computerized system forming a computer based communications network between network members having filter means for controlling the communication linkage between such network members based upon chosen filter conditions set up by the network members and the system to satisfy one or more requests for quotation from the network members.

BACKGROUND OF INVENTION

Buyers in need of goods and services often spend considerable time locating an appropriate vendor. Buyers use trade publications, directories, recommendations, and other means to locate vendors. If the type of vendor needed is in a foreign country, the problem compounds. Vendors advertise through various media and by direct sales methods to make known to potential buyers what they sell and how to contact them. Once a buyer identifies a few vendors, each must be contacted to obtain product or service price and availability information. This is a time consuming process and companies typically rely on experienced purchasing staff to accomplish it. In addition, when buyers must sell surplus inventory from time to time they must advertise, cold call, sell to brokers or the like. These processes are costly and time consuming for most businesses.

The prior art describes computerized shopping systems which employ some kind of central database of goods and services offered to buyers. Information about the goods and services offered is stored centrally and must be kept current centrally. The volume of information required to be maintained and updated in a central database system restricts it to a limited type or number of goods and services or number of vendors it can offer. It is not feasible for such systems to provide access to all standard goods and services and all suppliers world wide. For such a central database to exist, the amount of information to be stored would be awesome as would be the task of keeping it current. It simply is not feasible for central database systems to satisfy the need of buyers to receive timely quotes on an enormous variety of goods and services from vendors anywhere in the world. For this reason existing centralized database systems are created and maintained by the one or a few vendors whose goods and prices are displayed. These systems necessarily restrict a buyer's choice of vendors.

These systems are like electronic supermarkets which are owned by a single company or an association of suppliers. In such systems a vendor provides its database of goods and/or services to a buyer who orders items from the vendor's database. It is analagous to walking into a vendors store and selecting items from the vendors available stock. Another such system is analagous to shopping in a mall. In this case a number of (complementary) vendors combine to offer their collective inventory to the buyer through individual databases or a combined database of available goods or services. In yet another existing system a primary seller, such as an insurance agency, offers to provide buyers premium quotations from the insurance carriers for which the agency is an agent.

In all of the above cases the vendors responding to the buyers request regarding a particular good or service are either the service provider or a vendor with whom the service provider is involved in another business relationship such as advertisers in a common publication or affiliated insurance carriers. These select vendors provide the product and pricing information supplied by the system to buyers. These systems have no capacity to offer an unlimited number of goods and services from any number of vendors who wish to become members of the system. This would require an unrealistically large central database containing information about products, services and vendors. Each vendor would be required to provide detailed information to the central database about its product lines and would be required to update them daily. Accordingly, existing systems are very specialized electronic buying services with a limited selection of goods, services, and vendors. In addition, buyers wishing to sell surplus inventory from time to time cannot use these systems for that purpose.

The present invention is analagous to a cross between telephone and broadcasting technologies. It is this difference which creates the opportunity for buyers to relate to vendors without a rigid structure operating through a centralized computer database as required by existing methods.

SUMMARY OF THE INVENTION

The present invention is a computerized system forming a computer based communications network for processing requests for quotation for goods and/or services by broadcasting such requests to network members of the computerized system over any conventional transmitting medium, such as the Internet, to which the computerized system may be connected. No central database of goods, prices, etc. is involved. Instead, buyers formulate requests for quotation and transmit them to the computerized network which broadcasts the request for quotation of one or more specified standard products to prospective sellers based on filter conditions set by the buyer and/or the seller and/or the network operator. The filter compatible sellers' responses are communicated to the prospective buyer either over the communications network or via other acceptable communications means. Their responses are processed by the quotation system and submitted to the requesting buyer.

The method of the present invention processes requests for quotation for goods and/or services from a buyer or supplier of goods and/or services through a computerized system forming a computer based communications network of network members for linking buyers to suppliers with the computerized system having at least one central processing unit including operating system software for controlling the central processing unit and storage means containing the identification of the network members, wherein the method comprises a computerized system receiving a buyer's request for quotation over a communication network; selecting one or more appropriate vendors to receive the buyer's request for quotation based on filter conditions, if any, set by the buyer, vendor and the network software; transmitting or making available the buyer's request for quotation to said selected vendors over a communications network; and said selected vendors communicating their quotations either directly to the buyer or to the computerized system which in turn makes available or transmits said received quotations to the requesting buyer.

The computerized system of the present invention forms a computer based communications network for processing requests for quotation for goods and/or services through at least one central processing unit with said computerized system comprising operating system software for controlling the central processing unit and storage means containing appropriate identity and other information about members of the network, means for potential buyers of product and/or services to transmit a request for quotation to said central processing unit, means for said central processing unit to selectively broadcast or make available said request for quotation to selected network vendor members, means for said vendor members to respond directly to the requesting buyer or to said central processing unit and means for transmitting or making available from said central processing unit vendor's quotations to the requesting potential buyers.

BRIEF DESCRIPTION OF THE DRAWINGS The following detailed description may best be understood by reference to the following description in conjunction with the accompanying drawings in which:

FIG. 1. shows a network diagram of the computerized system of the present invention where the Internet is the communications network;

FIG. 2. shows a block diagram representing how a buyer interacts with the computerized system of this invention via the Internet;

FIG. 3. is a block diagram of how a vendor's offer of items for special sale is communicated to network buyer members;

FIG. 4. is a data flow diagram linking vendors and buyers to a hypothetical central office arranged to demonstrate an embodiment of the quotation system of this invention;

FIG. 5. and FIG. 6. show logic for processing requests for quotation such that all filter conditions are met and a predetermined number of vendor responses are returned to the requesting buyer;

FIG. 7. shows a hypothetical list of options for use in preparing requests for quotation to be routed over the network. It is one embodiment of data structures suitable for buyers and vendors to interact via the quotation system network of this invention;

FIG. 8. shows a hypothetical illustration of a request for quotation.

DETAILED DESCRIPTION OF THE INVENTION

The present invention is a computerized quotation system forming a computer based communications network for processing requests for quotation for goods and services from respective buyers or vendors who broadcast such requests to network members of the computerized system. There is no central pricing database to limit the number of buyers and vendors of goods and services or to limit the number of goods and services which can be processed. However the goods and services must be standard items to ensure that there is no confusion as to what buyers are requesting and what sellers are offering to buyers. FIG. 1 shows the system of this invention as configured using the Internet as the communications network.

A network member is anyone or any company which has registered as a user by completing an application and can be a buyer and/or a vendor in using the services provided by the computerized system of the present invention. The programming (e.g. Internet HTML pages or quotation system provided software) which enables network members to interact with the network would include information sufficient for network members to identify standard goods or services that they wish to identify in a request for quotation. Standardization of product or service descriptions is essential to avoid confusion unless a more text oriented specification is appropriate to the product or service type. To this end preprogrammed menu information is provided to classify product and services in catagories broken down by functional class and subclass corresponding to the products as they are commercially known and identified. Such menus are readily upgraded to include new and revised commercially available products and services from the manufactures or suppliers of such products and services. Buyers would use this information to prepare requests for quotation which will then be clearly understood by vendors. This product and other information and programming or software could be made available to network members either by direct electronic transfer to the user's personal computer or by providing information, software, or data on computer disks, compact disks, or other appropriate means. Providing standardized information to network users is necessary to correlate product and service identifications for buyers and vendors among other system maintenance functions. FIG. 4 shows how information would flow in an Internet embodiment of this invention. The quotation system central office would maintain its Internet site HTML pages and other necessary items by communication with its HTML World Wide Web server. It would download from the Web site requests for membership as well as requests for quotation. The Central Office would process RFQs through appropriate software and would wait for vendors to contact the Central Office FTP site. Vendors would use quotation system supplied software to cross reference their inventory to link with product lists used by the quotation system.When contacted the Central Office would acquire via suitable vendor software the RFQ information required and available from the vendors product database. If the vendor has prepared information relating to special sales, this information would be transferred to the Central Office at this time. Software version and list upgrades would be performed as well. When the FTP transfers are complet, the Central Office would prepare RFQ e-mail for requesting buyers and forward same as required.

New vendors may apply for membership using the quotation system's World Wide Web application form or by contacting quotation system offices by other means. Buyer members would access the quotation system's World Wide Web site and apply for membership or request price quotations or other available information, such as a trade publication search engine or statistical charts of price versus time by product, provided through the quotation system's Web site. New members would receive password information via e-mail to ensure that applicants have provided correct e-mail coordinates.

The invention can be understood readily from the following description of the preferred embodiment in conjunction with the flow diagram of FIG. 2 in which communication between buyers, sellers and the network computer(s) is completed using the Internet. A World wide Web home page is set up to provide access to the network by Internet members. A potential user accesses the Internet using any standard Web browser and becomes a quotation network user by completing a registration application providing necessary data about itself. Once registered, a member can access the forms necessary for preparing a request for quotation ("RFQ"), which will be described in greater detail hereafter. The RFQ is subsequently downloaded to a quotation system central office computer through a file transfer protocol (FTP) connection to the Internet Web server.

The RFQ is then processed to select vendors who are capable of quoting on the RFQ and who meet any other conditions set by the requesting buyer (e.g. language, currency, or vendor location). In addition, vendors may "deselect" themselves from quoting on certain types of RFQs by registering their preferences with the quotation system to avoid receiving RFQs of certain types. The buyer and vendor filters may represent in their simplest form defined classes of suppliers and/or buyers and may extend to delineate conditions of sale and/or purchase. Limitations or conditions included in the RFQ and/or in the response are defined for purposes of the present application as filter information or simply "filters". Filtering performed by a quotation system computer may simply involve limiting the network members to whom the RFQ is given and/or to whom responses are given or may be a more complex selection process. Part of the process of selecting vendors involves quotation system business arrangements and other considerations. An example of this would be providing vendors varying categories of service which may require prioritizing the vendors according to a formula. In this way, by the category of service they choose, vendors may determine the percentage of RFQs they receive from a given number received by the quotation system. FIG. 5 and FIG. 6 show sample logic for processing filter conditions to accomplish vendor selection for a given RFQ. FIG. 7 shows hypothetical buyer and vendor information items which could comprise the RFQ data packet.

Once vendors are selected to receive RFQs, the RFQ information may be transmitted to them via FTP over the Internet, however, a preferred way would be to provide vendors with software which permits them to schedule when they wish to communicate with the quotation system. In this case, the vendor software would contact the quotation system over the Internet via FTP; the quotation system would interrigate the vendor's product database (using suitable software which links or cross references the vendor's inventory to the quotation system product and services lists) and retrieve pricing and other information necessary to respond to the RFQ; and thereafter prepare e-mail to be sent to the requesting buyer member. FIG. 8 shows one possible arrangement of RFQ data which would be e-mailed to a buyer. In this example a request for quotation is sent for 5,000 OH006-2000656 type J resistors manufactured by Ohmite for delivery by Aug. 1, 1993. The buyer indicates that the delivery date is firm. Other information such as RFQ date, tracking number and product code are shown. In this case the sender has specified that this request for quotation be routed to vendors in the state of New Jersey USA only. The lower portion of FIG. 6, shows a response from for example Acme Supply, Inc. together with pricing, contact information, delivery and vendor notes indicating that the request can be "Shipped 1000 per box from inventory, subject to prior sale."The e-mail could be configured as HTML pages and read as HTML by the buyer's browser directly or via application helper software provided by the quotation system. One advantage to providing buyers with HTML type e-mail quotations is that hypertext links can be embedded in the quotation along with data about the quotation which would permit the buyer to select a response option directly from the quotation HTML page. The option may be to request that an e-mail purchase order be sent to a vendor and that the buyer's credit information, e.g. on file with the quotation system, be used to effectuate automatically a credit purchase of the quoted product. Other alternatives include providing quotations to buyers via FTP or through interaction with the quotation system World Wide Web Internet site. As an alternative, communications between buyers and sellers may be by telephone, e-mail or other means.

Shipping companies can be included in the process if a credit purchase conditions the vendor's payment on confirmation from the shipper that the delivery has been received and accepted by the buyer. The quotation system would verify the buyer's credit and notify the vendor of the purchase order and credit code. When the vendor ships the package using a participating shipper and the buyer accepts the goods, the shipper would communicate the delivery acceptance to the quotation system computer or directly to the credit provider to permit release of funds to the vendors account. This would be particularly useful in international transactions.

Although the above example uses the Internet as the communications network between buyers, sellers and the quotation system computer, other computer communications arrangements can be used as well. Also, although the quotation computer system may execute all functions using one node on a communications network, it is equally suitable to have multiple nodes at many sites to service all network users. FIG. 1 shows two such quotation system central computers. In this event, all nodes would intercommunicate as required to complete routing of user information and other functions.

The quotation system computer is schmatically shown in FIG. 4 as the "Central Office" and includes a random access memory for temporary storage of information, a read only memory for permanent storage of the computers configuration and basic operating commands, an input/output adapter for connecting peripheral devices and known input and interface devices. Visual output is provided by display adapters and display devices. The network computer is controlled by one or more central processing units which may include a conventional microprocessor and a number of other units interconnected via a system bus. Any operating system may be resident on the computer. Programming for the buyer's and vendor's computer type equipment would be appropriate to the variety of goods and services buyers and vendors wish to sell over the network and would change as new goods and services come into existence and old ones are discontinued. FIG. 3 shows in block diagram a process by which vendors may offer items "on sale" to quotation system buyers. In this case, buyers will be informed of the sale if they identify or have identified the product or its category to the quotation system and provided the vendor has defined filter conditions which include the buyer in the class of buyers to which the vendor wishes to communicate its "on sale" offer.

Limiting the class of recipients may be used by large organizations to communicate exclusively to other members of their organization. For example, large corporations may make special sale offers exclusively to their employees. Alternatively, general users can offer to donate products exclusively to charitable or not for profit organizations.

The process of the present invention begins when a buyer prepares a network compatible request for quotation (RFQ).

The buyer additionally may prepare or has previously prepared a definition of the class of vendor to receive the request. The request or requests are telecommunicated to a quotation network computer and is thereafter routed to the specified class of vendors consistent with network software and vendor requirements or conditions, if any. Vendors in the defined class respond to the buyer's request for quotation and the buyer may purchase from a responding vendor. The number of vendors within the specified class will depend on the buyer's class specification. For example, a buyer who specifies vendors of volt meters in New York State will reach more vendors than if New York City alone were specified. Such class specifications are information filters through which only the desired vendors can pass. By joining the network, all vendors are potential class members no matter where in the world they are located. In addition, a vendor may choose to filter out requests for quotation for other than a vendor defined class of requests for quotation, e.g., requests must be for at least 10,000 pieces or for goods produced by a specific manufacturer. The computerized system may also add a filter, for example, to reflect the type of service selected by the buyer and/or vendor. The network computer's filter may time sequence routing of the buyer's request based on the vendor's distance from the buyer's location. This would give vendors with the lowest shipping charges earlier access to the buyer's request and would give the buyer an opportunity to cancel further routings of its request if responses indicate that more distant vendors are not likely to provide more competitive quotes than those already received.

When a vendor wants to receive requests for quotation over the network, the vendor notifies the network of the class of goods or services in which the vendor deals (a "request for quotation class definition"). This can be communicated by voice, telephone, fax, et cetera, or by use of programming provided for that purpose but the preferred method is to use programming provided for that purpose by the network. The request for quotation class definition is transmitted to the network and the network uses that definition to filter all requests for quotation routed to the vendor, i.e.,to the class defined by a buyer of which the vendor is a member. In this way the vendor receives only those requests for quotation which conform to the vendor's request for quotation definition. The number of vendors within a class to receive a request for quotation may be very large. To keep the process manageable network software may be arranged to limit the number of vendors to receive a request for quotation.

By using the present invention, a network member buyer in Frankfurt, Germany who requests a quotation for an electronic part may receive quotations within minutes from previously unknown network member vendors in Cupertino, Calif. and Kyoto, Japan.

Where appropriate, programming would enable the user to receive, review, and reply to responses from network users. Programming would be tailored to the various types of request for response network users require. Users can be buyers and/or vendors. When a user wants to buy something, the programming for preparing a request for quotation is invoked on the user's computer or computer like device. When a user wants to sell something, a request for quotation class definition is prepared using programming provided for that purpose. A typical situation in which a user who is predominantly a buyer may choose to be a vendor is when the user overstocks an item and chooses to resell the surplus inventory via the network. To sell surplus inventory without the network of this invention requires advertising, word of mouth, cold calling, sale to a broker or the like. In addition, the network software could be arranged to enable vendors to donate unwanted equipment, et cetera, to charity network members. In addition, the network filters could be defined to permit intra organizational notices of availability or requirements for products or services, especially in large distributed corporations or governmental agencies.

The network is a routing service with the routing being controlled by class description filters which can be specified by the buyer, the network computer, and the vendors. By analogy, it is like a cross between a telephone call and a radio broadcast where the ultimate recipient is neither an individual nor a mass audience, but a class of recipients identified by their characteristics. In the preferred embodiment the vendor class of network members are filtered to be selected based on their likelihood to respond to the request for quotation. Alternatively, or in addition, the vendor responses may likewise be filtered to satisfy conditions of the vendors responding or in accordance with predefined conditions for facilitating a linkage between the prospective buyer and an acceptable seller.

What we claim is:

1. A computerized system for forming a computer based communications network of network members inclusive of network buyers and or network vendors for processing requests for quotation for goods and services through at least one central processing unit including operating system software for controlling the central processing unit, said network members being remotely located from said central processing unit and connected thereto via a communications channel storage means containing identification of the network members, means for network buyers to generate request for quotation for goods and/or services, means for transmitting said request for quotation to said central processing unit, filter means for filtering the network members in said storage means to determine which network members are to receive said request for quotation based upon filter conditions set up by the network buyer in said request for quotation or by the central processing unit in accordance with preestablished conditions, means for broadcasting said request for quotation to the network members selected by said filter means and means for responding to the generator of said request with either a response from the selected network members or with a list of said selected network members for said generator of said request to establish independent communication.

2. A computerized system as defined in claim 1 wherein said network members communicate via the Internet through said central processing unit.

3. A method for processing requests for quotation for goods and/or services from a party representing a buyer or supplier of goods and/or services through a computerized system forming a computer based communications network of network members for linking buyers to suppliers with the computerized system having at least one central processing unit including operating system software for controlling the central processing unit and storage means containing the identification of the network members, wherein the method comprises the steps of:

receiving a buyer's request for quotation over a communication network;

selecting one or more appropriate vendors to be sent the buyer's request for quotation based upon filter conditions, set by the buyer, vendor and the network software; transmitting the buyer's request for quotation separately to said selected vendors over said communications network; and with said selected vendors communicating their quotations either directly to the buyer or to the computerized system which in turn transmits said received quotations to the requesting buyer.

4. A computerized system for engaging in transactions over a data network, said computerized system comprising:
   a plurality of terminals, at least one of which being designated a requestor and others of which are designated vendor terminals;
   filter and broadcast means for receiving, over said data network, requests from said requestor to engage in transactions with unspecified vendor terminals, and for filtering said requests to determine with which vendor terminals said requests should be matched; and
   means for matching said requests with vendor terminals which meet predetermined filter conditions for generating quotes from information contained in a database associated with said vendor terminals, and for accepting said quotes from said vendor terminals, wherein the central database contains information that is insufficient to consummate the transaction.

5. The computerized system of claim 4 further comprising means for communicating responses from said vendor terminals to said filter and broadcast means; and
   means at said filter and broadcast means for communicating a selected set of said responses to said requestor.

6. The computerized system of claim 5 wherein said transaction is a purchase, and wherein the purchase may comprise a plurality of items.

7. The system of claim 6 further comprising: means for establishing communications between said filter and broadcast means and said vendor terminals which meet said filter conditions; and means for determining whether a quote for said transaction from a particular vendor terminal meeting said filter conditions should be sent to said requestor.

8. The method of claim 7 wherein said communications is continuous.

9. The method of claim 7 wherein said communications is periodic.

10. The method of claim 9 wherein said communications is initiated by said vendor terminal.

11. The apparatus of claim 4 wherein further comprising means for automatically notifying a buyer when particular items meeting specified conditions become available from a seller.

12. A method of purchasing goods or services over a data network comprising the steps of:
    communicating, over said data network, to a filter means, at least one request for a quotation from a potential buyer of said goods or services;
    filtering, at said filter means, the at least one request in order to ascertain a set of sellers potentially capable of supplying said goods or services; and
    obtaining, from at least one of said potential sellers, over a data network, quotes to supply said goods or services, and forwarding said quotes to said potential buyer, wherein at least part of the quote information is stored at a location remote from said filter means.

13. The method of claim 12 further comprising the step of accepting filtering conditions from said potential buyer, and utilizing said filtering conditions in said step of filtering to determine a subset of potentially capable sellers.

14. The method of claim 13 wherein said set is limited by said filter conditions and by a predetermined maximum number from which a bid is to be received.

15. The method of claim 12 wherein said step of obtaining comprises the step of each seller contacting said filter means at predetermined intervals and supplying bids in response to any requests for proposal that have arrived at said filtering means and that were determined, by the filter means, to be a request for proposal for goods or services which said each seller is potentially capable of supplying.

16. The method of claim 12 wherein said step of obtaining comprises the step of automatically and periodically supplying the filter means with information sufficient to assemble a bid, and then assembling such bid in response to a request for a bid, and sending the bid to said potential buyer via e-mail.

17. A method of matching buyers of goods and services with sellers of goods and services over a data network comprising the steps of;
    communicating, from buyers to a filter means, requests for quotes (RFQs);
    filtering said RFQs so that only sellers meeting a first set of filter conditions receive said RFQs;
    transmitting, to remotely located seller databases, the filtered RFQs;
    accepting quotes from sellers meeting said first set of filter conditions, and filtering said quotes so that only quotes meeting additional filter conditions are sent to a buyer requesting said quotes.

18. The method of claim 17 wherein said additional filter conditions are determined by said vendor.

19. The method of claim 17 wherein said additional filter conditions are determined by said filter means.

* * * * *

(12) EX PARTE REEXAMINATION CERTIFICATE (9569th)
United States Patent
Giovannoli

(10) Number: US 5,758,328 C1
(45) Certificate Issued: Mar. 21, 2013

(54) COMPUTERIZED QUOTATION SYSTEM AND METHOD

(75) Inventor: Joseph Giovannoli, Saddle River, NJ (US)

(73) Assignee: Source Search Technologies, LLC

Reexamination Request:
No. 90/011,857, Aug. 11, 2011

Reexamination Certificate for:
Patent No.: 5,758,328
Issued: May 26, 1998
Appl. No.: 08/603,906
Filed: Feb. 22, 1996

(51) Int. Cl.
*G06Q 30/06* (2006.01)
(52) U.S. Cl.
USPC ............................ 705/26.4; 705/26.43
(58) Field of Classification Search .................. None
See application file for complete search history.

(56) References Cited

To view the complete listing of prior art documents cited during the proceeding for Reexamination Control Number 90/011,857, please refer to the USPTO's public Patent Application Information Retrieval (PAIR) system under the Display References tab.

*Primary Examiner* — Jalatee Worjloh

(57) ABSTRACT

A computerized system for forming a computer based communications network of network members inclusive of network buyers and or network vendors for processing requests for quotation for goods and services through at least one central processing unit including operating system software for controlling the central processing unit, storage means containing the identification of network members, means for network buyers to generate request for quotation for goods and/or services, means for transmitting said request for quotation to said central processing unit, filter means for selecting appropriate network members to receive said request for quotation based on filter conditions defined by the buyer in said request for quotation and/or by the vendor and/or by the central processing unit, means for broadcasting said request for quotation to the network members selected by said filter means and means for responding to the generator of said request for quotation with either a response to said request for quotation or with a list of said selected network members. Filter conditions may define the class of vendors in terms of geographical location, quantity, language spoken, currency, special conditions of sale, and the like.

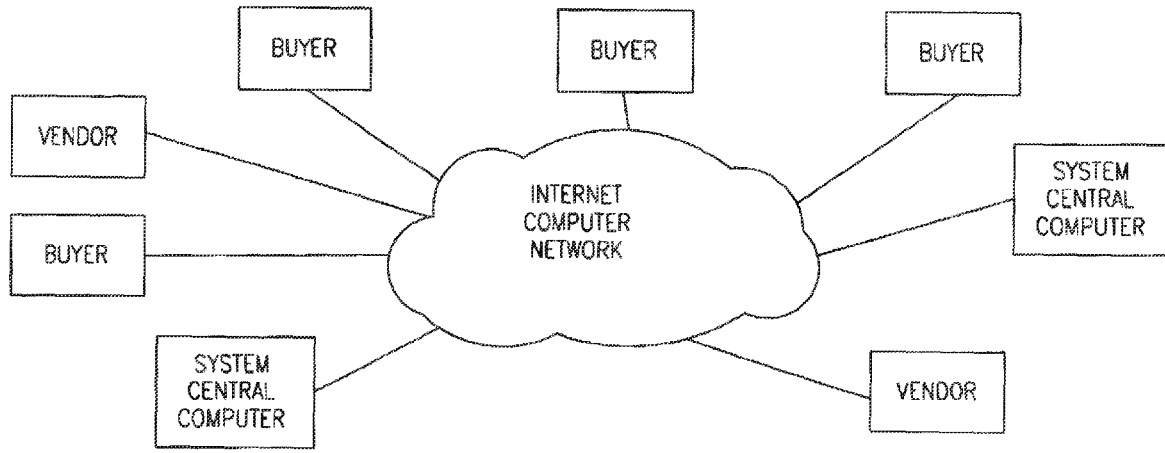

Figure 1:
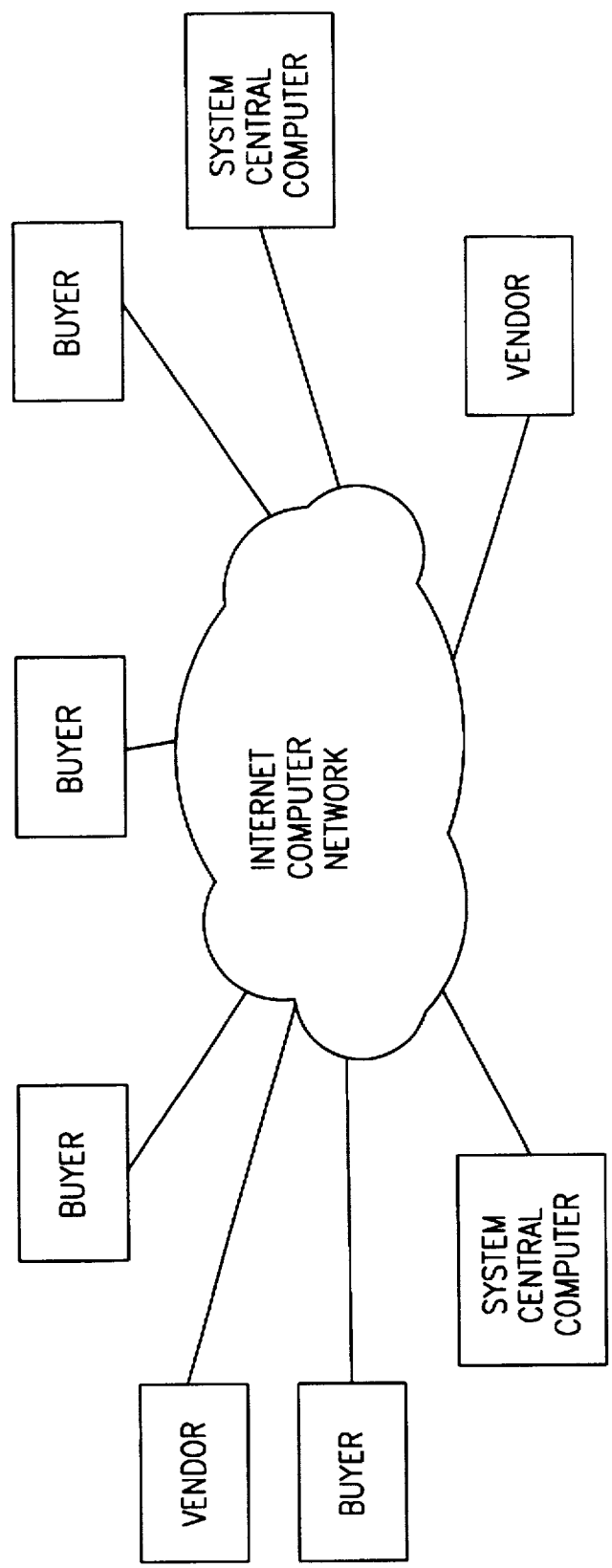
Figure 4:
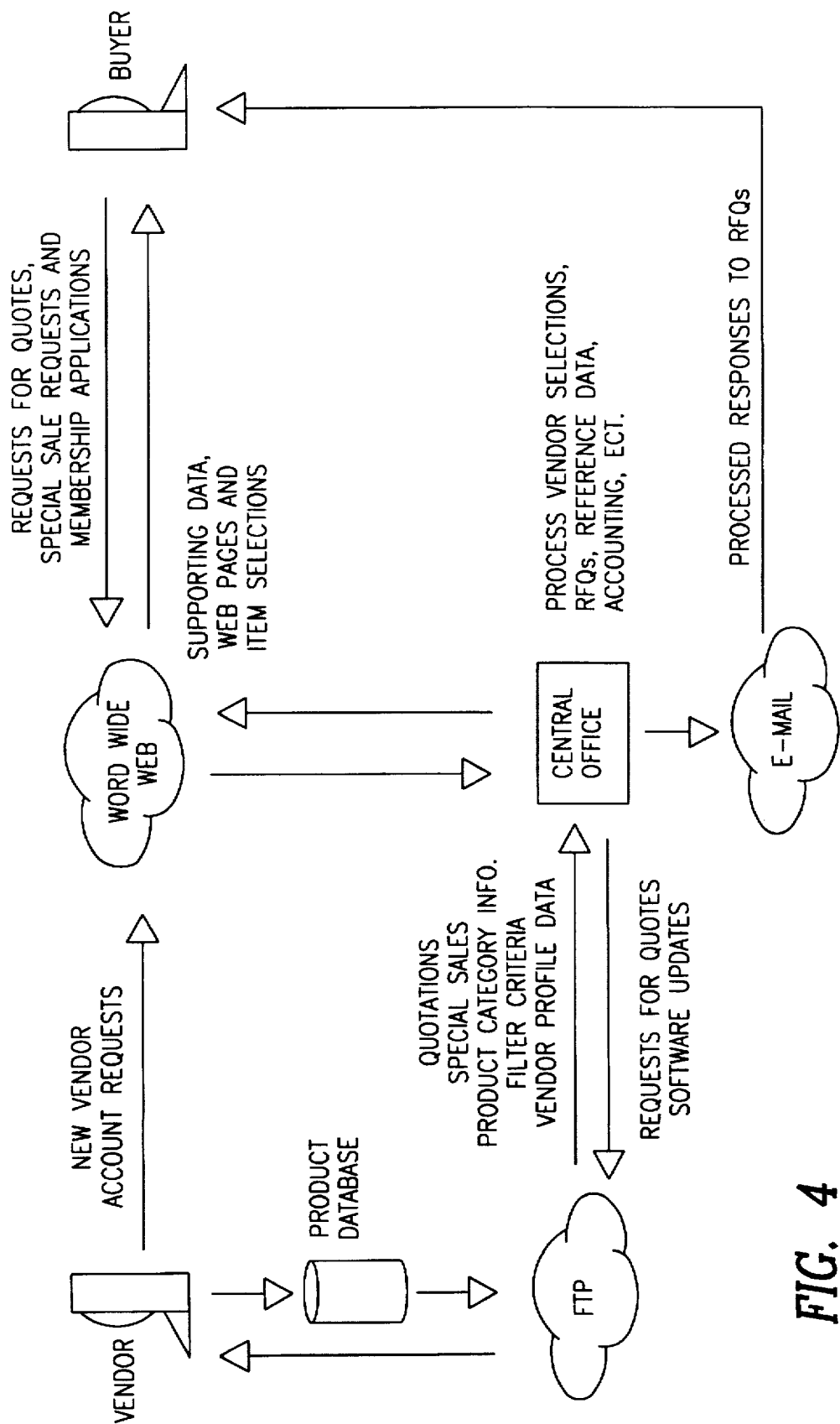
Figure 5:
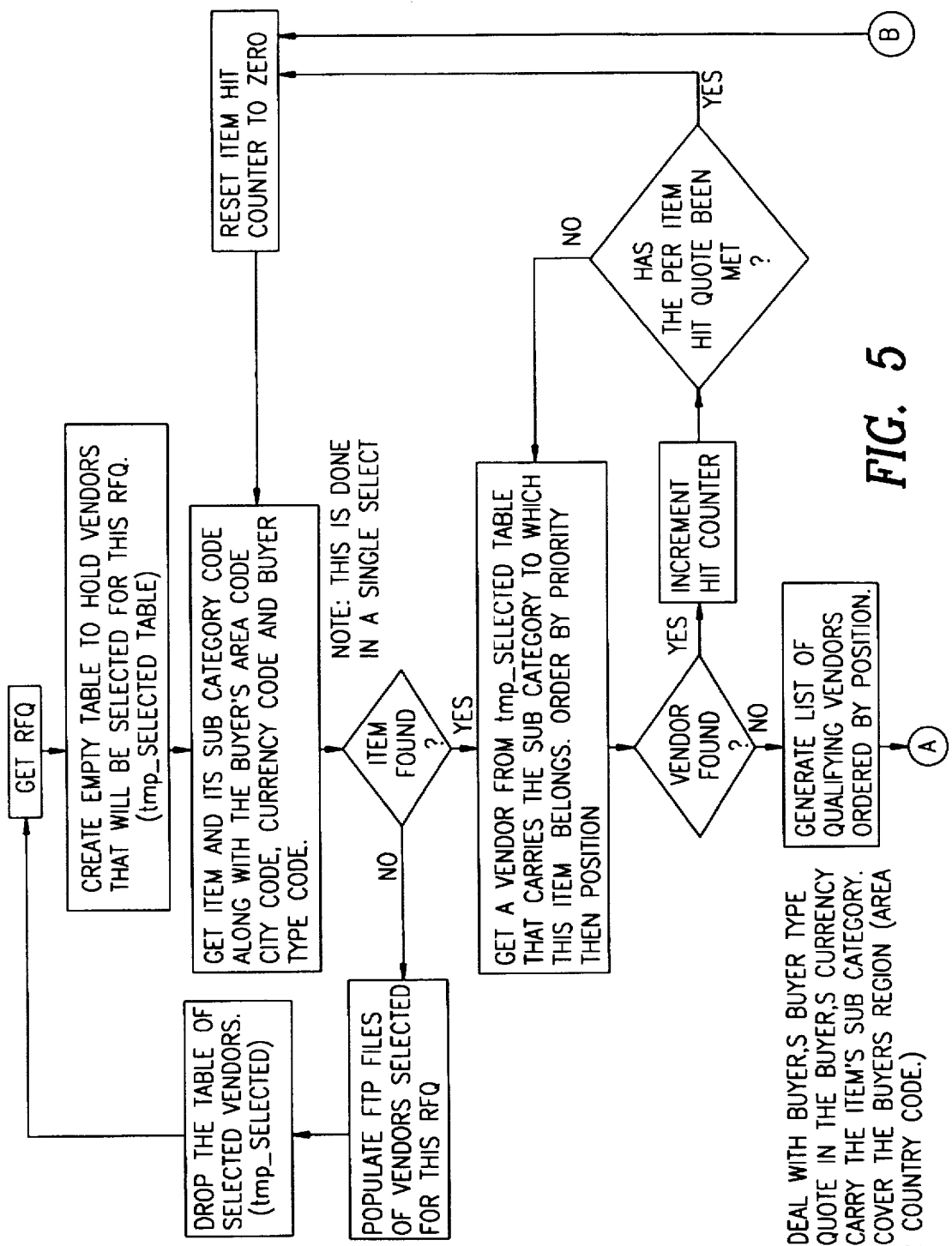
Figure 6:
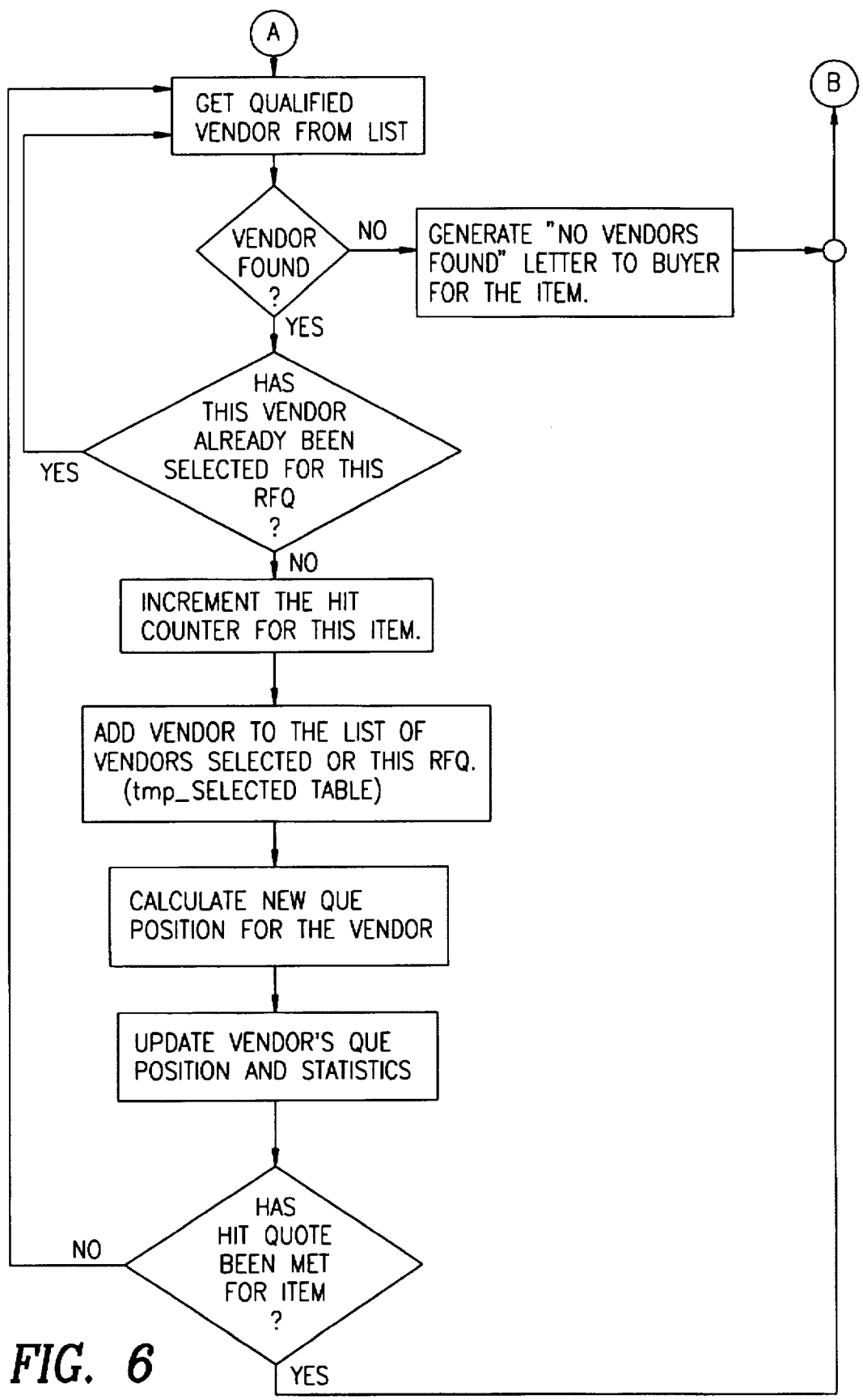

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 17-19 are cancelled.

Claims 4 and 12 are determined to be patentable as amended.

Claims 5-11 and 13-16, dependent on an amended claim, are determined to be patentable.

New claims 20-31 are added and determined to be patentable.

Claims 1-3 were not reexamined.

4. A computerized system for engaging in transactions over a data network, said computerized system comprising:
   a central database;
   a plurality of terminals, at least one of which being designated a requestor and others of which are designated vendor terminals;
   filter and broadcast means for receiving, over said data network, requests from said requestor to engage in transactions with unspecified vendor terminals, and for filtering said requests to determine with which vendor terminals said requests should be matched; and
   means for matching said requests with vendor terminals which meet predetermined filter conditions for generating quotes from information contained in a database associated with said vendor terminals, and for accepting said quotes from said vendor terminals, wherein the central database contains information that is insufficient to consummate the transaction.

12. A method of purchasing goods or services over a data network comprising the steps of:
    communicating, over said data network, to a filter means, at least one request for a quotation from a potential buyer of said goods or services;
    filtering, at said filter means, the at least one request *for quotation* in order to ascertain a set of sellers potentially capable of supplying said goods or services; and
    obtaining, from at least one of said potential sellers *previously ascertained by said filtering said request for quotation*, over a data network, quotes to supply said goods or services, and forwarding said quotes to said potential buyer, wherein at least part of the quote information is stored at a location remote from said filter means.

*20. A method of purchasing goods or services over a data network comprising the steps of:*
   *communicating, over said data network, to a filter means, at least one request for a quotation from a potential buyer of said goods or services;*
   *filtering, at said filter means, the at least one request for quotation in order to ascertain a set of sellers potentially capable of supplying said goods or services; and*
   *obtaining, by said filter means, responsive to said filtering, from at least one of said potential sellers, over a data network, quotes to supply said goods or services, and forwarding said quotes to said potential buyer, wherein at least part of the quote information is stored at a location remote from said filter means.*

*21. The method of claim 12 further comprising embedding, in said quote, a link from which said potential buyer may facilitate a purchase of the good or service directly from said seller.*

*22. The method of claim 21 wherein said link is a hypertext link.*

*23. The method of claim 12 wherein said obtaining comprises utilizing software which automatically retrieves pricing and other material terms of an offer from a database associated with at least one of said sellers.*

*24. The method of claim 12 wherein said obtaining comprises obtaining said quotes via an Internet website.*

*25. The method of claim 12 wherein said communicating is in response to a buyer accessing an Internet website.*

*26. The method of claim 12 further comprising the step of distributing, to the buyer, pre-programmed menu information for use in preparing the requests for quotation.*

*27. The method of claim 26 further comprising the step of distributing, to the seller, software for use in responding to requests for quotation.*

*28. The computerized system of claim 4 further comprising means for notifying a potential buyer via email of special sales.*

*29. The method of claim 12 further comprising notifying the potential buyer via email of special sales.*

*30. The method of claim 12 further comprising providing vendors varying categories of service by prioritizing said vendors according to a formula.*

*31. The method of claim 30 wherein said prioritizing comprises time sequence selected sellers based upon prescribed criteria.*

\* \* \* \* \*